Dec. 27, 1960     C. C. LAURITSEN     2,966,117
ROCKET
Filed March 6, 1946
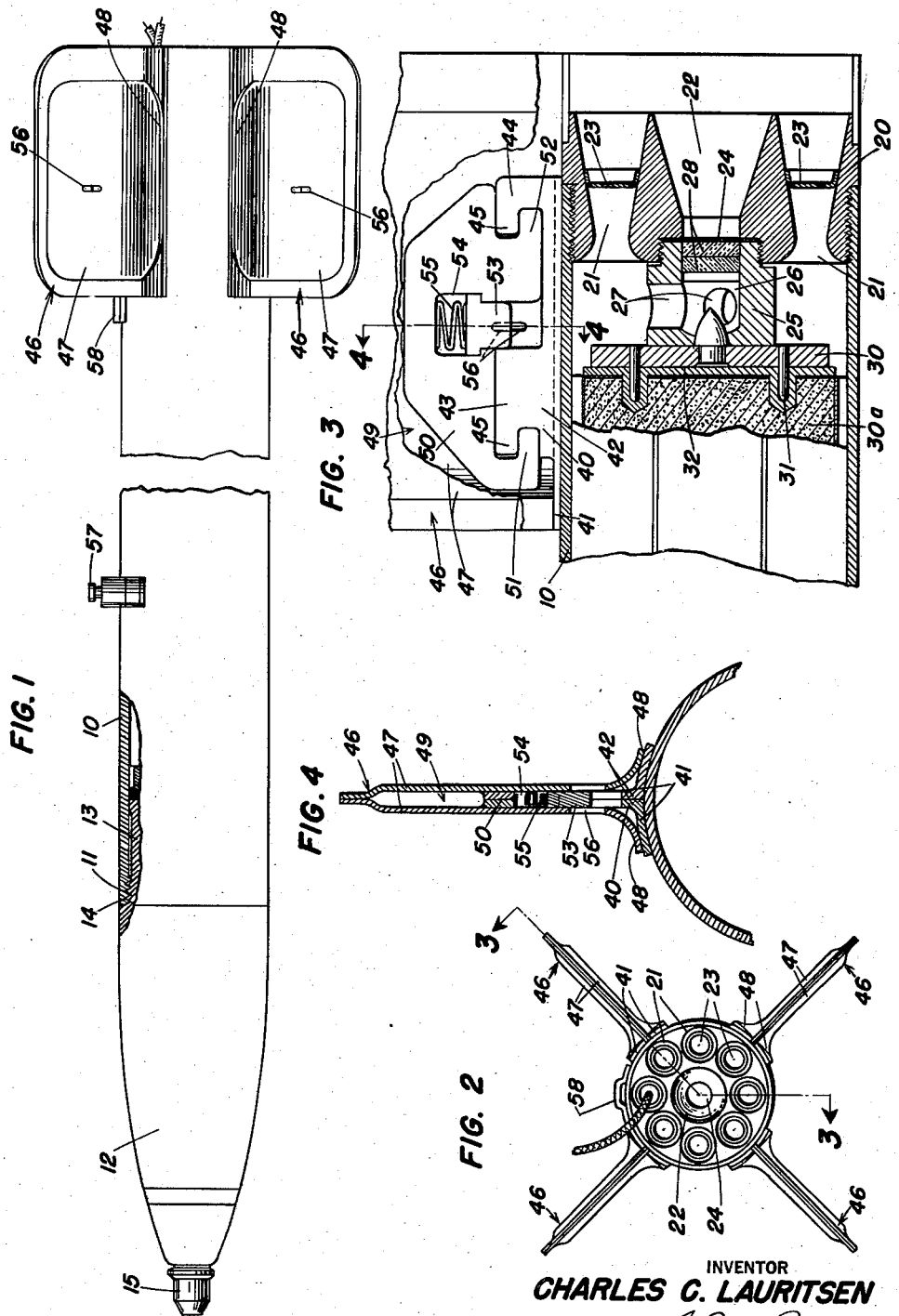
INVENTOR
CHARLES C. LAURITSEN
BY
ATTORNEY

United States Patent Office 2,966,117
Patented Dec. 27, 1960

2,966,117
ROCKET

Charles C. Lauritsen, Pasadena, Calif., assignor to the United States of America as represented by the Secretary of the Navy Filed Mar. 6, 1946, Ser. No. 652,439

2 Claims. (Cl. 102—50)

This invention relates to rocket projectiles and has particular relation to rockets provided with stabilizing means for insuring an accurate trajectory.

One object of the invention is to provide an aircraft launched rocket having stabilizing fins which incorporate a simple and dependable fastening arrangement to permit shipping of the rocket with its fins detached, the fins being readily and quickly attachable in the field by merely snapping them on, the advantage of this facility in the interest of speed of assembly in very urgent circumstances being the absence of the necessity of using screws, bolts or fastening devices of a similar kind which, because of their nature consume excessive periods of time for assembly.

Another object of the invention is to provide an aircraft launched rocket which is particularly designed to be projected from what is known as a "zero-length" launcher.

These and other objects of the invention will be better understood by reference to the following description and accompanying drawing, in which Fig. 1 is an elevational view, partly in section, of a rocket incorporating a preferred embodiment of the present invention.

Fig. 2 is rear elevational view of the rocket shown in Fig. 1.

Fig. 3 is an enlarged fragmentary sectional view of the rear end of the rocket shown in Fig. 1 and taken on the line 3—3 of Fig. 2, and Fig. 4 is a fragmentary sectional view taken on the line 4—4 of Fig. 3.

Referring to the drawing, the rocket includes a motor tube 10 which is internally threaded at its forward end 11 to support a nose or head structure 12 which functionally may be similar to a fragmentation, armor-piercing or chemical shell etc. The head structure has a rear end portion 13 of reduced diameter which slips within the forward end 11 of the motor tube 10 and is threaded for attachment thereto as at 14. The head structure is provided with a suitable nose fuze 15 which may be conventional and the base is provided with a base fuze (not shown) preferably of the type shown in copending application Ser. No. 576,119, now Patent No. 2,873,681, assigned to the same assignee as is the present invention. Fuzes of this type are designed to be armed by the pressure generated in the rocket motor.

The rear end of the motor tube is closed by a nozzle block 20 in the form of a disk having a ring of rearwardly directed nozzles 21 and a central or auxiliary nozzle 22. The nozzles 21 are closed by sealed disks 23 preferably in the form of plastic cups wedged into the nozzles from the rear end. The auxiliary nozzle 22 is closed by a shear disk 24 designed to give way at some predetermined pressure.

The construction and function of the auxiliary nozzle and shear disk is more fully disclosed in copending application Ser. No. 612,608, now Patent No. 2,515,049, assigned to the same assignee as the present invention. The shear disk is held in place by a grid support member 25 which is screwed into the forward end of the nozzle block. The grid support member is provided with a longitudinal bore 26 communicating with the auxiliary nozzle and lateral ports 27 opening into the combustion chamber of the rocket. Within the bore 26 are cover disks 28 of insulating material to protect the shear disk 24 from the heat generated by the burning propellant.

A grid 30, conforming to the cross section of the propellant 30a is supported by the grid support member 25. The grid 30 is provided with pins 31 which fit in the end piece of plate 32 of plastic inhibitor material such as cellulose acetate. This material is cemented to the end of the propellant grain. Several fin attachment plates 40 are secured to the motor tube 10 and in the present instance four pairs of such plates are shown. Each plate is L-shaped in cross-section having an arcuate leg 41 adapted to be welded to the motor tube and a radiating leg 42 adapted to be welded to the corresponding leg of its companion attachment plate. The radiating rib 42, thus formed by each pair of attachment plates 40, is notched to form a forward lug 43 and a rearward lug 44, each lug including a forwardly directed tongue 45 at the radial extremity of the lug.

Each pair of attachment plates receives a fin 46. Each fin comprises a pair of rectangular plates 47 spotwelded together around three sides, their fourth sides being flared outwardly as indicated by 48 and rest on the attachment plates 40. The two plates 47 of each fin define a cavity 49 adapted to receive the radiating ribs 42 of the attachment plates. Within the cavity is a latch plate 50 secured between the cover plates 47. The latch plate 50 is provided with tongues 51 and 52 which interlock with the tongues 45 of the forward and rearward lugs 43 and 44 respectively.

The procedure in assembling the fins and rocket motor is to set each fin down upon an upstanding rib 42. The fin is so directed that the tongues 51, 52 clear the tongues 45. The locking bar 53 preliminarily bears down upon the forward lug 43 whereby it is momentarily depressed into the recess defined by the notched portion 54 of the latch plate 50. The spacing between the lugs 43 and 44 is such that the rear tongue 52 of the latch plate may slip radially between the lugs 43 and 44 and thereupon the fin may be moved rearwardly. The tongues 51, 52 interlock with the tongues 45 of the attachment plate 40. The locking bar 53 then slips off the lug 43, being projected by the spring 55 behind it into the space between the rear tongue 52 and the forward lug 43 when the tongues 51 and 52 assume their locking positions. The foregoing assembly is the quickly accomplished telescoping of the fin 46 upon a rigidly upstanding plate 40, and then a short rearward motion to let the locking bar 53 do its engaging with a snap action. Small slots 56 are cut in the side plates of the fins so that a screw driver may be inserted to lift the locking bar to permit detachment of the fins.

Thus, it will be seen that the fins may be readily and quickly attached to the motor without the use of bolts, screws and the like and for all practical purposes remain an integral part thereof, but if for any reason it is desirable to repack the rocket for shipment, the fins may be readily removed.

The rocket may be launched from various types of launchers. If the rocket is fired from an aircraft it may be projected from a previously mentioned "zero-length" launcher, that is, a launcher of the type wherein the rocket is in free flight after moving only a nominal distance. For cooperation with such a launcher the rocket is provided with a forward button lug 57 and a rearward loop strap 58.

I claim:

1. In a rocket projectile comprising a motor tube containing a propellant charge, carrying a pay load at its forward end and having rocket nozzle means at its rear end, radiating fin locking members on said motor tube, said members defining a pair of forwardly directed interlocking elements, fins each formed of a pair of plates secured around the periphery to form a pocket open at one side to accommodate one of said members, each fin having therein a pair of rearwardly directed interlocking elements adapted to engage the elements of said fin-locking members to secure said fin, and latch means for holding said elements in their engaging position.

2. In a rocket projectile comprising a motor tube containing a propellant charge carrying a pay load at its forward end and having rocket nozzle means at its rear end, fin mounting fixtures on said motor tube in the form of rigid radiating members having forwardly directed hook portions, hollow fins adapted to fit over said fixtures and having rearwardly directed hook portions interengageable with said forwardly directed hook portions, and means assuming a position between certain oppositely directed hook portions to effect an interlock.

References Cited in the file of this patent

UNITED STATES PATENTS

| | | |
|---|---|---|
| 1,078,559 | Seabrook | Nov. 11, 1913 |
| 1,473,817 | Gorsline | Nov. 13, 1923 |
| 2,184,145 | Lambert | Dec. 19, 1939 |
| 2,400,248 | Morgan | May 14, 1946 |

FOREIGN PATENTS

| | | |
|---|---|---|
| 5,361 | Great Britain | of A.D. 1890 |
| 384,750 | Germany | Nov. 9, 1923 |
| 310,165 | Great Britain | Apr. 25, 1929 |
| 108,970 | Australia | Oct. 31, 1939 |